Patented Apr. 19, 1932

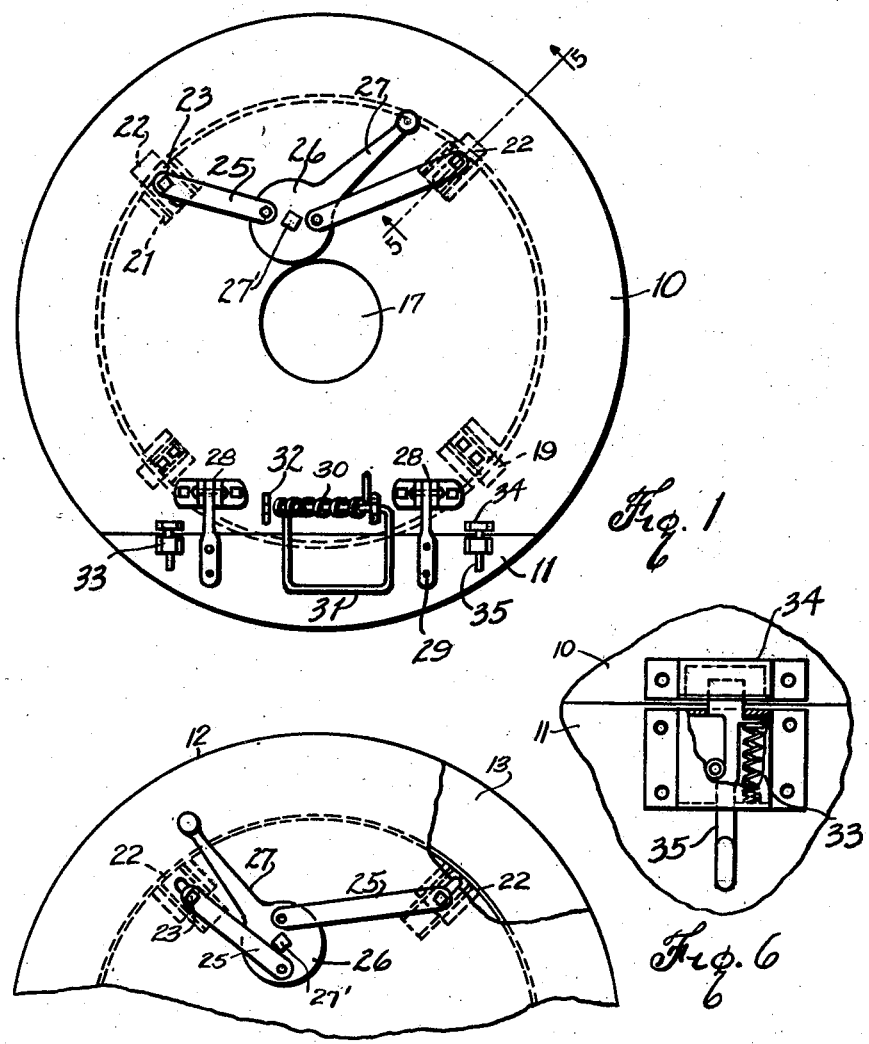

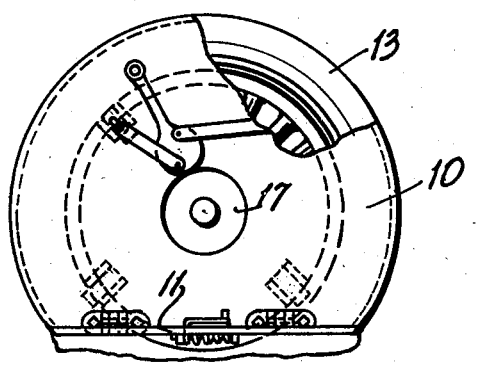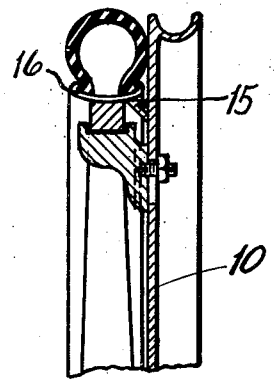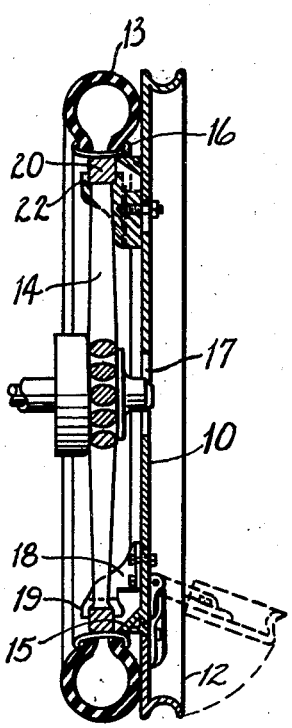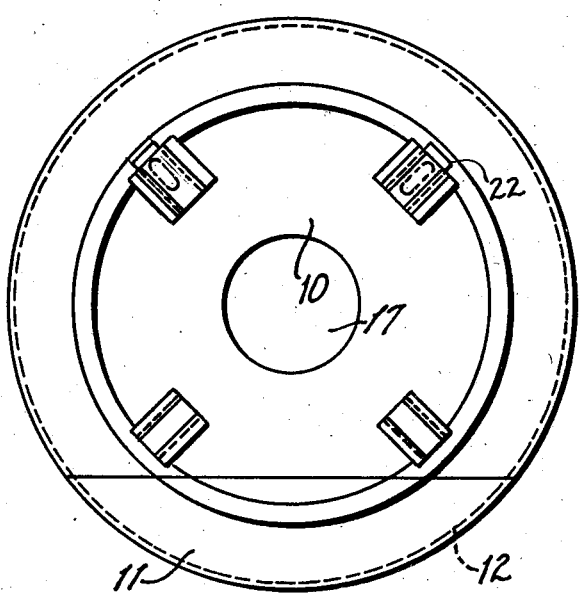

1,854,636

UNITED STATES PATENT OFFICE

EARL WESTBROOK AND GEORGE E. EVANS, OF NEAR WACO, TEXAS; SAID EVANS ASSIGNOR, BY MESNE ASSIGNMENTS, TO HARRY E. NEHIN, OF BUFFALO, NEW YORK

ATTACHMENT FOR MOTOR VEHICLE WHEELS

Application filed July 19, 1928. Serial No. 293,853.

This invention relates to new and useful improvements in attachments for motor vehicle wheels.

One object of the invention is to provide an improved attachment which may be readily and easily secured to a motor vehicle wheel when the tire thereof is punctured, whereby the punctured tire will be supported off the ground and the vehicle permitted to proceed on its journey.

A particular object of the invention is to provide an attachment which may be concentrically fastened to the wheel when the tire is deflated and which will automatically elevate the wheel and provide a concentric continuous circular support for the wheel when the vehicle is driven forwardly.

Another object of the invention is to provide means for quickly and easily fastening the attachment to the wheel together with means for automatically centering the attachment on said wheel.

A construction designed to carry out the invention will be hereinafter described, together with other features of the invention.

The invention will be more readily understood from a reading of the following specification and by reference to the accompanying drawings, in which an example of the invention is shown, and wherein:

Fig. 1 is an elevation of a wheel attachment constructed in accordance with the invention, Fig. 2 is a partial view of the same showing the lugs unlocked, Fig. 3 is an elevation showing the device attached to a wheel having a deflated tire, Fig. 4 is a vertical sectional view of the same, Fig. 5 is an enlarged sectional view taken on the line 5—5 of Fig. 1, Fig. 6 is a detail of the spring latch, and Fig. 7 is an elevation of the inner side of the device.

In the drawings the numeral 10 designates a disk or circular plate having a segment 11 cut therefrom. The disk and the segment provide a circular support and said parts are formed with an outwardly directed circumferential flange 12 which may be grooved for receiving a solid rubber or other tire (not shown). The disk without a tire or with a tire should have an over-all diameter greater than the tire 13 of the wheel 14 with which it is to be used, so as to support said tire off the ground when applied to the wheel.

In describing the device the segment 12 will be considered as a part of the disk, except when particularly referred to. A concentric boss or ring 15 is made integral with the inner face of the disk and is of such diameter as to snugly fit within the rim 16, thus automatically centering the disk on the wheel. The disk has a central opening 17 for receiving the hub of the vehicle wheel.

For securing the disk to the wheel a pair of lugs 18 are bolted to the inner side of the disk and each lug has a saddle 19 for engaging the felly of the wheel 14. These lugs are placed on the lower half of the disk and on the upper half a pair of sliding lugs 21 are mounted and formed with saddles 22 for receiving the felly 20. Each lug 21 has a shank 23 extending through a radial slot in the disk and pivoted to the outer end of a link 25. The links 25 are pivoted on the opposite sides of the center of a small locking wheel 26 having an operating lever 27 extending therefrom.

This wheel is pivoted on a stud 27' set to one side of the vertical center of the disk which causes one link 25 to be shorter than the other. When the lever 27 is shifted to the left, as is shown in Fig. 2, the wheel 26 will be rotated so as to move the links toward each other and thus slide the shanks 23 to the bottoms of the slots 24, thereby withdrawing the saddles 22 from the felly. When the lever is shifted to the right, as is shown in Fig. 1, the links will be spread and the lugs 21 moved outwardly so as to engage their saddles 22 with the felly and thereby lock the disk on the wheel 14.

It is obvious that when the tire 13 is punctured or deflated and the wheel 14 thus lowered, it would be impossible to concentrically fasten the disk on the wheel and to permit this the segment 11 is hinged to the body of the disk and swung outwardly, as is shown in Fig. 3. In carrying out this feature hinge members 28 are fastened to the disk and provided with straps 29 fastened to the segment. In order to swing the segment into the plane of the disk, a coiled spring 30 is provided with a loop 31 engaging the segment and hinged in brackets 32 on the disk proper. For holding the segment in the plane of the disk, spring latches 33 are mounted on the segment. Each latch is provided with a spring pressed plunger 35 which engages a keeper 34 on the disk. When the latches are disengaged from the keepers, the segment may be swung outwardly, as is shown in Figs. 3 and 4.

In using the attachment it will be assumed that the tire 13 is punctured or deflated, as is shown in Fig. 3. When it is desired to attach the device, the lever 27 is swung to the position shown in Fig. 2 and the latches 33 are disengaged so that the segment 11 may be swung outwardly, as is shown in Figs. 3 and 4. The segment will rest upon the ground when the disk 10 is presented to the wheel 14. The operator engages the saddles 19 of the lower lugs 18 on the felly 20 at the bottom of the wheel and swings the ring 15 into the rim 16, whereby the disk is automatically positioned concentrically on the wheel 14. The lugs 21 being withdrawn pass between the spokes of the wheel and by shifting the lever 27 to the right from the position shown in Fig. 2, to the position shown in Fig. 1, the lugs 21 are moved outwardly so that their saddles 22 engage the felly and lock the disk thereon.

The atachment is easily and quickly applied and it is not necessary to use a wrench or other tools. It is obvious that as soon as the vehicle is moved forward to partially rotate the disk, whereby the segment is lifted from the ground, the spring loop 31 will swing said segment into the plane of the disk, thus obviating the use of a jack or other means to apply and center the attachment. When the segment swings into place the latches 33 will automatically engage with the keepers 34 and the attaching operation is thus completed. The device may be quickly detached or may remain on the wheel as long as is desired.

Various changes in the size and shape of the different parts, as well as modifications and alterations, may be made within the scope of the appended claims.

What we claim, is:

1. In a motor vehicle wheel attachment, a circular supporting member having a portion movable from its place to permit said member to be concentrically attached to a wheel resting upon a deflated tire, said movable portion being permanently attached to the member, and means for automatically swinging the said portion into the plane of the member when the wheel is rotated.

2. In a motor vehicle wheel attachment, a circular supporting disk having a hinged segment, means for securing the disk to a vehicle wheel with the segment displaced laterally from the plane of the disk, and means for swinging the segment into the plane of the disk when the wheel is rotated.

3. In a motor vehicle wheel attachment, a circular supporting disk having a hinged segment, means for securing the disk to a vehicle wheel with the segment displaced laterally from the plane of the disk, means for swinging the segment into the plane of the disk when the wheel is rotated, and means for fastening the segment in position.

4. In a motor vehicle wheel attachment, a circular supporting member having a hinged section less than half its diameter, means for centering the member on a vehicle wheel when the latter is resting on a deflated tire, means for fastening the member to a vehicle wheel, and means for automatically swinging the hinged section into the plane of the member when the wheel is rotated.

5. In a motor vehicle wheel attachment, a circular supporting member having a hinged section less than half its diameter, means for centering the member on a vehicle wheel when the latter is resting on a deflated tire, means for fastening the member to a vehicle wheel, means for automatically swinging the hinged section into the plane of the member when the wheel is rotated, and means for fastening the section in position.

6. In a motor vehicle wheel attachment, a circular disk, a centering ring on the inner side of the disk, stationary lugs on the disk for engaging the felly of a wheel, a plurality of movable lugs on the disk for engaging the felly of a wheel to fasten the disk thereon, and means operating the movable lugs in common.

7. In a motor vehicle wheel attachment, a circular disk, a centering ring on the inner side of the disk, stationary lugs on the disk for engaging the felly of a wheel, movable lugs on the disk for engaging the felly of a wheel to fasten the disk thereon, an operating member pivoted on the disk, and links pivotally connecting the movable lugs with the operating member.

8. In a motor vehicle wheel attachment, a circular disk having a hinged segment, a spring actuated loop mounted on the disk and engaging the segment, latches on the disk for fastening the segment in the vertical plane thereof, and means on the disk for securing the same to a vehicle wheel.

9. In a vehicle wheel attachment, a circular supporting member having a portion of its periphery attached thereto for movement from the plane of the member to permit the same to be concentrically attached to a wheel resting upon a deflated tire, and means for automatically moving said portion into said plane to restore the circular outline of said member.

10. A rotary jack and auxiliary wheel for vehicle wheels or the like, said auxiliary wheel being composed of two segments of unequal sizes, a pivotal connection between said segments permitting said smaller segment to swing laterally relative to said larger segment, spring means yieldingly holding said smaller segment in one extreme position, means for securing said larger segment to one of the vehicle wheels whereby upon horizontal movement of said vehicle, said vehicle rides up on the said larger segment, and means for locking said smaller segment in circular relation to said larger segment.

11. An emergency tire for an automobile wheel comprising a ring for disposition at one side of the wheel and provided with a tread portion, said ring and its tread portion being transversely split into two arcuate sections, and axially alined means hinging said sections together, one of said sections being of considerably greater length than the other, whereby after securing said one section to a wheel and rolling the latter to dispose said one section against the roadway, said other section will be free of contact with said roadway and may be readily swung to operative position.

In testimony whereof we affix our signatures.

EARL WESTBROOK.
GEORGE E. EVANS.